United States Patent [19]

Lambert

[11] Patent Number: 4,479,080

[45] Date of Patent: Oct. 23, 1984

[54] ELECTRICAL BRAKING CONTROL FOR DC MOTORS

[75] Inventor: Joe C. Lambert, Charlottesville, Va.

[73] Assignee: General Electric Co., Charlottesville, Va.

[21] Appl. No.: 488,091

[22] Filed: Apr. 25, 1983

[51] Int. Cl.³ .............................................. H02P 3/14
[52] U.S. Cl. .................................... 318/373; 318/139; 318/258; 318/376
[58] Field of Search .............. 318/373, 375, 376, 139, 318/258, 261

[56] References Cited

U.S. PATENT DOCUMENTS

| 3,344,328 | 9/1967 | Morris | 318/258 |
| 3,958,163 | 5/1976 | Clark | 318/373 |
| 3,995,204 | 11/1976 | Konrad et al. | 318/367 |
| 4,388,573 | 6/1983 | Horiuchi et al. | 318/139 X |

FOREIGN PATENT DOCUMENTS

| 73320 | 6/1977 | Japan | 318/376 |
| 65286 | 4/1982 | Japan | 318/139 |

OTHER PUBLICATIONS

IEEE Standard Dictionary of Electrical & Electronics Terms, NASI/IEEE Std. 100–1977, p. 204.
U.S. Pat. application Ser. No. 288,083 filed Jul. 27, 1981 for "Electrical Braking Transitioning Control"—Clarke et al.

Primary Examiner—J. V. Truhe
Assistant Examiner—Bentsu Ro
Attorney, Agent, or Firm—Ormand R. Austin

[57] ABSTRACT

An electrical braking control circuit for use in a control system for a direct current traction motor which may be employed, for example, to propel an electrically driven vehicle. The electrical braking controller of the invention initiates electrical braking in a plug mode of braking and then, when conditions are suitable for regenerative braking, causes a transition to regenerative braking, followed by return to a plug mode of braking whenever regenerative braking can no longer be efficiently achieved, all of which is carried out smoothly and efficiently without unduly wasting regenerative power.

9 Claims, 5 Drawing Figures

| FIG.2A | FIG.2B |
| --- | --- |
| FIG.2C | |

ELECTRICAL BRAKING CONTROL FOR DC MOTORS

This invention relates generally to electrical braking of direct current motors and, more particularly to circuitry for efficiently controlling the braking mode (i.e., dynamic or regenerative) as electrical braking is being carried out.

BACKGROUND OF THE INVENTION

Electric vehicles, such as fork lift trucks, transit cars, etc., generally provide for electrical braking of the traction motor to assist the mechanical brakes in bringing the vehicle to a stop. In producing an electrical braking effort, the traction motor is electrically controlled to operate as an electrical generator, driven by at least one of the rolling wheels of the vehicle. Thus, as braking is being carried out, the traction motor is effective to convert the kinetic energy of the vehicle to electrical energy.

The method of disposing of this electrical energy classifies the mode of electrical braking being utilized. Generally, electrical braking is either dynamic, in which case the electrical energy is dissipated as heat in a resistive load, or regenerative, in which case the electrical energy is transferred back to the power source. A subset of dynamic braking is "plug" braking in which the armature resistance of the motor is itself used as the resistive load.

Obviously, regenerative braking is preferred if the power source is able to accept the regenerative energy and use it for other loads or if it is able to store it for later use. For efficiency, however, the current developed by the motor during regeneration must be great enough to provide the necessary field excitation. As is well known, the current generated is a function of motor field current and armature rotational speed. Thus, as the vehicle speed is reduced, the ability of the motor to regenerate energy is also reduced. For a series wound traction motor in which a portion of the armature regenerated current is used as field current for the motor, a point will be reached, at some speed, at which all of the regenerative energy is required just to maintain the field excitation and no energy is available to be retransferred to the power source. At this speed, regenerative braking must be terminated and some form of dynamic braking initiated. In the prior art, two transitions have been undertaken when the vehicle is being braked: a first transition from propulsion to regenerative braking and a second transition from regenerative braking to dynamic braking.

For a series wound electric traction motor, the transition from a propulsion mode to an electrical braking mode requires that current through either the field or armature winding be reversed. The preferred method generally is to reverse the field winding connections. Since this also reverses the polarity of the voltage on the armature (which then acts as a generator), a contactor is normally used to reconnect the armature into the proper configuration for regenerative braking. In many instances the residual flux in the armature and field winding will be sufficient to establish regenerative braking as soon as the reconnection has occurred. In other instances, however, the residual flux may be either of the wrong polarity or may be insufficient to permit regenerative braking to be established. Many prior art systems have dealt with these problems by incorporating a resistance which connects the armature to the power source (usually a battery) in such a manner that a current path through the motor insures initiation of regenerative braking. The problem with this solution is that a resistance, regardless of size, may consume from five to ten percent of the available regenerative energy and create heat dissipation problems.

One method of dealing with these shortcomings is shown in U.S. patent application Ser. No. 288,083, now U.S. Pat. No. 4,423,363 filed July 27, 1981, which application is of common assignee with the present invention. In that method, a controllable resistance is connected between the armature and the power source to provide an initial current path through the armature to establish the proper polarity of flux to enable regenerative braking. While offering a considerable advance over the art, two problems remain even with this method of initiating regenerative braking. First, since most traction motors are not equipped with tachometers, there is no indication of motor speed and a directional change at or near zero speed will result in an attempt to regeneratively brake. A period of time then follows during which there is insufficient torque to produce acceleration or deceleration. The only motor current during this period is that allowed by a resistor inserted for initial field excitation. The second problem is that the use of a resistor initially to establish minimum field current and flux results in an undesirable dissipation of power.

Other problems also arise with prior art controls during the subsequent transition from regenerative braking to dynamic braking. In performing this switching function, field current is normally reduced to zero to avoid producing large current transients. The reduced field current and reduced armature potential permits braking torque to die out and the gearing between the motor and wheels to relax. The subsequent reinitiation of braking torque produces a jerky reaction on the vehicle. Even with the apparatus disclosed in the aforementioned patent application Ser. No. 288,083, now U.S. Pat. No. 4,423,363 there is a short period of time, approximately 50 milliseconds, during which the regulator controlling power to the motor is cut off.

Accordingly, it is among the objects of the present invention to provide an electrical braking control for a direct current traction motor which overcomes such inherent prior art problems as those outlined above.

More particularly, it is an object of the present invention to provide an electrical braking controller which initiates electrical braking in a plug mode of braking and then, when conditions are suitable for regenerative braking, causes a transition to regenerative braking, followed by a return to a plug mode of braking whenever regenerative braking can no longer be efficiently achieved, all of which is carried out smoothly and efficiently without unduly wasting regenerative power.

SUMMARY OF THE INVENTION

An electrical braking control circuit according to a preferred form of the invention includes a first control means causing the braking current to enter a plug braking current path and the braking to be carried out in the plug braking mode immediately upon initiation of electrical braking; a first sensing means for monitoring the current in the plug braking path; a second sensing means for monitoring the ratio of on-time to off-time for the regulator which regulates power to the motor; and a second control means responsive to the amplitude of the plug braking current and the on-off ratio of the regulator to switch braking current into a regenerative braking current path whenever the plug braking current is greater than a preselected value and, simultaneously, the on-off ratio of the regulator is less than a preselected value. Further, the invention includes a third sensing means to monitor the regenerative braking current and additional control means responsive to the regenerative current amplitude to cause braking to switch back to a plug mode of operation whenever the regenerative current is less than preselected values for preselected time periods.

BRIEF DESCRIPTION OF THE DRAWINGS

While the specification concludes with claims particularly pointing out and distinctly claiming the subject matter regarded as the invention, the invention will be better understood from the following description taken in connection with the accompanying drawings in which:

DETAILED DESCRIPTION OF THE INVENTION

Figure 1:
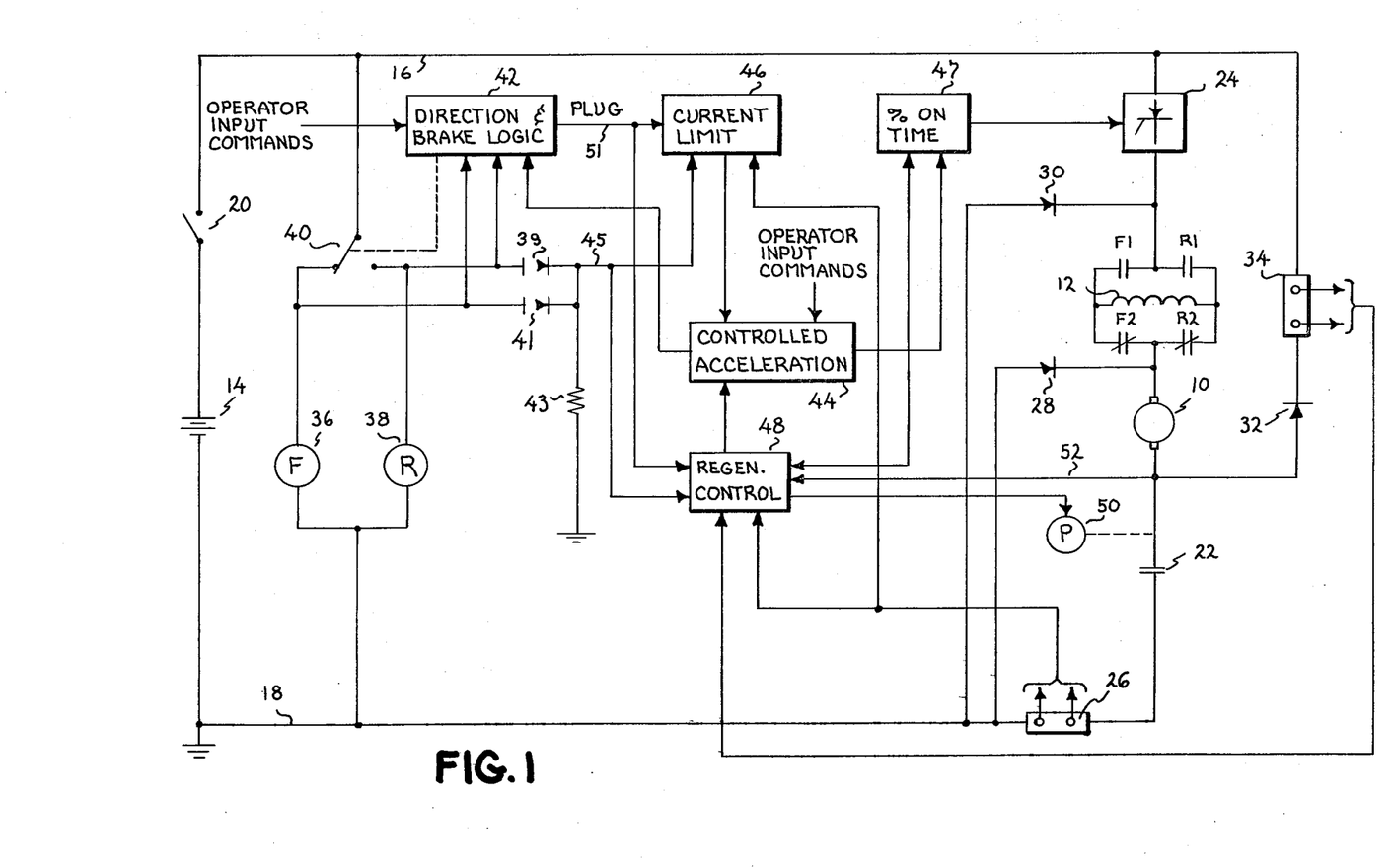
FIG. 1 is a simplified block diagram of a traction motor control system incorporating an electrical braking control circuit according to the invention.

In FIG. 1, a series wound traction motor is illustrated which includes an armature winding 10 and a field winding 12. By mechanical arrangement, not illustrated, the armature 10 may be connected, for example, to the driven wheels of an appropriate vehicle. Armature and field windings, 10 and 12, respectively, are arranged to be excited by battery power source 14 which supplies current through positive and negative power busses, 16 and 18, respectively. An on-off switch 20 connected in series with the positive bus 16, allows the battery power to be switched on or off for the system.

In a conventional manner, a set of normally open contacts 22 and a power regulating circuit 24 are connected in series with the motor windings 10 and 12. The regulator 24 is connected between the positive bus 16 and the field winding 12; the contacts 22 are connected between the negative bus 18 and the armature winding 10. Preferably, the power regulating circuit 24 is a time ratio control for a chopper circuit of a type well known in the art. The motor field winding 12 is arranged to be connected in either a forward or a reverse direction by means of a plurality of contacts F1, F2, R1 and R2. A current shunt 26 is connected in series between the motor and the power source 14 as a sensor to provide a signal indicative of the magnitude of motor current. The motor power circuit also includes a plugging diode 28 connected between the power bus 18 and the junction intermediate the motor armature 10 and field winding 12. A free-wheeling diode 30 is connected between the power bus 18 and the junction between field winding 12 and power regulator circuit 24. The free-wheeling diode 30 is utilized to provide a current path for the inductive motor current when the regulator 24 is non-conductive. A regenerative braking diode 32 is connected from the junction between the contacts 22 and armature 10, through a current shunt 34, to the positive power bus 16. The current shunt 34 provides a signal indicative of the magnitude of regenerative braking current.

The forward and reverse contacts about field winding 12 are controlled by forward and reverse contactor coils 36 and 38, respectively, which are connected between power busses 16 and 18 by means of a multi-position forward/reverse switch 40. Switch 40 is controlled by a direction and brake logic circuit 42 responsive to operator input commands for determining the direction of motor rotation and the desire for electrical braking. Diodes 39 and 41, in conjunction with resistor 43, form an OR circuit responsive to the position of switch 40 to provide a NEUTRAL signal (which is a logical zero or low voltage level signal) on line 45 when neither coil 36 nor coil 38 is energized. Notable is the fact that in changing positions, switch 40 passes through an intermediate such that a NEUTRAL signal is always generated when a change in direction (i.e., electrical braking) is called for.

A controlled acceleration circuit 44 also responds to operator input commands by providing control signals to a percent on-time controller 47 which, in turn, determines the duty cycle (indicative of the ratio of on-time to off-time) of regulator 24. The duty cycle of regulator 24 thus determines the average magnitude of current passing through the motor windings 10 and 12. A current limit circuit 46 receives the NEUTRAL signal and a motor current signal from current shunt 26 and interacts with a controlled acceleration circuit 44 to limit and regulate motor current. The controlled acceleration circuit 44, current limit circuit 46, and direction and brake logic circuit 42 are substantially identical to such circuits described in greater detail in U.S. Pat. No. 3,958,163, the disclosure of which is incorporated herein by reference.

A regenerative control circuit 48 controls the energization of contactor coil 50 which determines the state of contacts 22, i.e., whether they are open or closed. Furthermore, when operating in an electrical braking mode, the state of contacts 22 determines whether such braking is being carried out in a plug mode or in a regenerative mode. When operating in the normal, propulsion mode, contactor coil 50 is energized and contacts 22 are closed.

Operation of the control system of FIG. 1, including the braking control circuitry, is as follows.

During normal running operation—either forward or reverse—switch 20 is closed to apply power to the armature and field windings 10 and 12 respectively, and to power regulator 24. By an operator's input command to direction and brake logic circuit 42, switch 40 is directed to be in a position to activate either forward contactor coil 36 or reverse contactor coil 38, depending on which direction is selected by the operator. A second operator input command (e.g., from an accelerator pedal), applied to controlled acceleration circuit 44 determines the motor rotational speed and power. That is, control acceleration circuit 44, acting in conjunction with percent on-time controller 47 determines the duty cycle of regulator 24 in response to an operator's command.

Electrical braking is initiated by the operator, through direction and brake logic circuit 42, causing switch 40 to reverse its position. This, in turn, de-energizes the previously energized contactor coil, 36 or 38, and energizes the one previously de-energized. A NEUTRAL signal is produced on line 45 by the transition of switch 40 from one position to the other. Contacts F1, F2, R1 and R2 respond accordingly, ultimately causing the direction of current through field winding 12 to reverse and thereby produce a reversal of the motor field flux. Braking torque, at some point, becomes proportional to the operator's accelerator control and if electrical braking is continued, propulsion is begun in the opposite direction.

The braking control is triggered by a "Plug" signal issued by direction and brake logic circuit 42. The Plug signal appears on line 51 following initiation of braking. Operation of the control is such that, immediately upon initiation of electrical braking, the regeneration control circuit 48 causes the braking current to flow in a plug braking path. This is carried out by maintaining contacts 22 closed immediately following initiation of braking. The plug braking current flows from the lower terminal of armature 10, through contacts 22, current shunt 26, and plugging diode 28 back to the upper terminal of armature winding 10.

While in the plug braking mode, signals from current sensing shunt 26 and from percent on-time controller 47 are monitored by the regeneration control circuit 48. Thus, in effect, percent on-time controller 47 acts as a sensor providing a signal indicative of the ratio of on to off times for the regulator 24.

If, and when, the plug current is greater than a preselected value simultaneously with the occurrence of the duty cycle of regulator 24 being less than a preselected value, the regeneration control circuit 48 de-energizes contact coil 50 and opens contacts 22. The braking current generated by armature 10 is then switched into a regenerative braking path comprising the regenerative braking diode 32 and the regenerative current sensor 34. Thus, whenever conditions are such that regenerative braking can be effectively maintained—as determined by the percent on time of regulator 24 and the level of armature current—there is a transition to that mode. On the other hand, if regenerative braking cannot be effectively carried out, operation continues in the plug mode until reversal of the motor is accomplished.

At some point, the motor speed decreases to the point that, even with regulator 24 operating at 100 percent duty cycle, the desired motor torque cannot be maintained. At such point it then becomes necessary to switch braking operation back to the plug mode.

This is achieved through regeneration control circuit 48 which senses the regeneration current through sensor 34 and activates contactor coil 50 whenever the regeneration current is less than a first preselected value of current for a first preselected time period or is less than a second preselected value of current for a second preselected time period. The second preselected current value is chosen to be less than the first current value; and the second preselected time period is chosen to be shorter than the first time period. Notable, however, is the fact that braking current continues to flow in the regeneration path until the tips 22 are actually closed. This particularly avoids a problem in some prior art systems wherein it is necessary to have the regulator 24 turned off for a period of time to allow the contact tips to transition. The open or closed state of tips 22 is monitored via line 52.

Once returned to the plug mode with contactor tips 22 closed, a predetermined minimum value of current is established which may then be increased up to a higher value of plug current.

In controlling of the braking mode of operation, regeneration control circuit 48 thus implements a number of control functions. These include: (1) causing the braking current to flow in the plug braking path immediately upon initiation of electrical braking; (2) causing the contactor coil 50 to deenergize, switching braking current from the plug braking path to the regenerative braking path whenever the plug current is sufficiently high and the duty cycle of regulator 24 is sufficiently low; and (3) causing the coil 50 to be reactivated whenever regenerative braking current remains below preselected current levels for excessive time periods.

Figures 2, 2B:
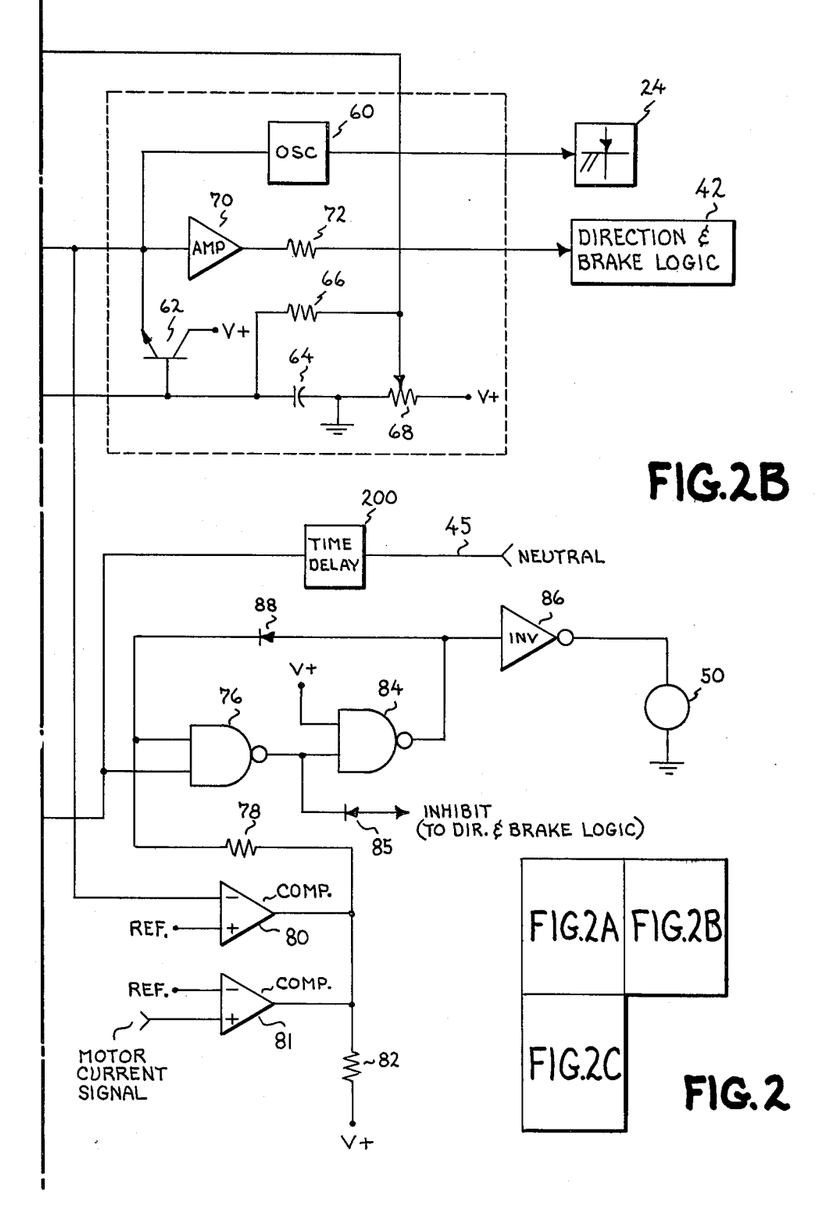
FIG. 2 (composed of FIGS. 2A, 2B and 2C) is a detailed schematic circuit diagram of an electrical braking control circuit for use in the control system of FIG. 1.

Referring now to FIG. 2 (FIGS. 2A, 2B and 2C taken together), the percentage on time (duty cycle) of power switching circuit 24, controlling the application of power to motor armature 10 and field winding 12, is directly related to the magnitude of a voltage signal applied to the input terminal of oscillator 60. The oscillator 60 is of the type adapted to provide an output pulse signal whose pulse width is proportional to the oscillator input voltage level and may, for example, be of the type shown in U.S. Pat. No. 3,843,912. When operation is in either the propulsion or the plug braking mode, the voltage signal to oscillator 60 is taken from an accelerator control circuit comprised of transistor 62, capacitor 64, fixed resistor 66, and potentiometer 68. Potentiometer 68 is connected at one end to a source of dc voltage, not shown, and may also be mechanically connected, for example, to an accelerator control such as a foot pedal to provide controlled acceleration of the traction motor and its associated vehicle. Under normal operating conditions, the average current allowed to pass by regulator 24 is proportional to the position of the moveable arm of potentiometer 68; as the arm is advanced toward the voltage supply end of the potentiometer, regulator 24 applies more power to the motor, increasing the speed and/or torque.

The magnitude of voltage applied to the oscillator 60 is monitored by threshhold amplifier 70 which supplies a signal, through resistor 72, to the direction and brake logic circuit 42 to cancel the PLUG signal (which, as described above, was generated by the direction and brake logic circuit 42 upon initiation of braking) whenever the duty cycle of the regulator 24 is above a preselected level, e.g., 12 to 15 percent. However, since the duty cycle may be higher during regenerative braking, the effect of the plug cancel signal is inhibited when in the regenerative braking mode. Means for achieving this effect are more fully described herein below.

As explained in conjunction with FIG. 1, initiating electrical braking generates a NEUTRAL signal on lines 45 (three places in FIG. 2) which is effective to initialize the circuitry of FIG. 2 for operation in the braking mode. Immediately following the NEUTRAL signal, which is a low level logic zero signal, the PLUG signal is applied at lines 51 (two places in FIG. 2). The PLUG signal is a high level, positive voltage, logic one signal.

Thus, at the start of electrical braking the PLUG signal is applied, through resistor 74, to one input of NAND gate 76. Connected to the other input of NAND gate 76, through resistor 78, is the combined output signal from duty cycle comparator 80 and the motor current comparator 81. The output terminals of these comparators, 80 and 81, are tied together and returned to a positive voltage source through a resistor 82. The operative effect of comparators 80 and 81 is to produce a logical AND of the output signals. That is, a logical one, or a relatively high positive level signal is produced and applied to NAND gate 76 only if the output from both comparators 80 and 81 is high. As will be explained, this occurs whenever the duty cycle of the regulator 24 is below a preselected value and the motor current is above a preselected value.

To achieve this result, duty cycle comparator 80 has, as an input to its inverting terminal, a voltage, from the emitter of transistor 62, proportional to the duty cycle of regulator 24. This voltage is compared to a reference voltage applied to the non-inverting terminal of comparator 80 so that the comparator output is positive (high level) whenever the duty cycle indicative voltage is less than the reference voltage. Correspondingly, motor current comparator 81 has, as an input to its non-inverting terminal, a voltage signal indicative of the magnitude of motor current generated. If the motor current signal is greater than the reference voltage applied to the inverting terminal of comparator 81, the output of comparator 81 is positive. Thus, the signal applied to the NAND gate 76 from comparators 80 and 81 is high if, and only if, the duty cycle of regulator 24 is sufficiently low and the motor current is sufficiently high. The motor current signal may, of course, be obtained by virtue of the current shunt 26. The reference voltages applied to the input terminals of comparators 80 and 81, as are all other reference voltages discussed or shown herein, are independent, very stable dc reference points which may each be derived by any number of well known techniques from the system power source.

With high level signals at both input terminals, the output of NAND gate 76 is a logical zero. This produces the inhibit signal mentioned above, indicating that braking is in the regenerative mode. The inhibit signal is applied through diode 85 to the direction and brake logic circuit 42. The output of NAND gate 76 is also applied to one input of a second NAND gate 84 which has its other input tied to the positive supply voltage. With a low level input from NAND gate 76, the output of NAND gate 84 is forced high. This output signal is inverted to a low level by inverter 86, causing the de-energization of contactor coil 50 and the opening of contacts 22 (FIG. 1). Braking current is then switched into the regenerative braking current path as has been described above in conjunction with FIG. 1. A feedback diode 88 is effective to latch NAND gates 76 and 84 so long as the PLUG signal remains high.

The state (opened or closed) of contactor tips 22 is monitored by tip comparator 90. For this purpose, the contact tip connected directly to the motor armature is tied via line 52 through a conventional contact debounce circuit 92 and a diode 94 to the non-inverting input of comparator 90. With the tips closed, the voltage on line 52 is substantially at ground potential; with the tips open, however, the voltage is at some elevated level. Thus, when in the regenerative braking mode, a positive voltage will be applied to reverse bias diode 94 which then allows a positive voltage to be applied to the non-inverting input of comparator 90 through resistor 96. Since this positive voltage is in excess of the reference voltage at the inverting input terminal of comparator 90, the output of tip comparator 90 is forced to a positive high level whenever the contactor tips 22 are open. This condition is indicative of braking operation in the regenerative mode. The high level at the output terminal of comparator 90 is effective to back bias diode 98 which controls operation of transistor 100. The emitter terminal of transistor 100 is connected to oscillator 60. Following a high level output from comparator 90, a logical zero is produced at the output of inverter 101, which, through diode 102 and resistor 103 inhibits conduction of transistor 62. Thus, during the plug braking mode, or the normal running mode of operation, transistor 100 is inhibited and transistor 62 controls oscillator 60. During regenerative braking, on the other hand, transistor 62 is inhibited and transistor 100 controls oscillator 60.

Transistor 100, during operation in the regenerative braking mode (i.e., when not inhibited by the signal applied through diode 98), is controlled by comparator 104 whose output is connected to the base of transistor 100 through resistor 106. A positive high level output signal from comparator 104 turns transistor 100 on. The non-inverting input to comparator 104 is connected to a reference voltage while the inverting input is connected through resistor 108 to the slider of a regenerative current limit potentiometer 110, and through resistor 112 to the collector terminal of transistor 114. The current limit potentiometer 110 receives the output from differential amplifier 116, to the input of which, a current signal is applied from regenerative current sensor 34. The voltage produced across potentiometer 110 and applied to the slider connection thereof is thus proportional to the regenerative braking current. A similar voltage is developed across potentiometer 118 which is connected in parallel with potentiometer 110. The function of potentiometer 118 will be discussed more fully herein below. A series resistor 120 commonly terminates potentiometers 118 and 110 to ground.

In operation, the regenerative braking current signal developed at the slider of potentiometer 110 is compared with a reference voltage by comparator 104. Whenever the regenerative current signal is greater than the reference voltage, the output of comparator 104 is at a low level and transistor 100 is turned off. Turning transistor 100 off then turns oscillator 60 off and, consequently, power regulator 24 is shut down. When the regenerative current signal falls below the reference value at comparator 104, the comparator output goes positive, operation is reversed and the power regulator 24 is controlled to operate at some duty cycle. The portion of the circuitry just discussed thus functions as a regenerative current regulator when operation is in the regenerative braking mode.

In order to be responsive to the accelerator position (the position of potentiometer 68), transistor 114 is effective to raise or lower the current limit to the inverting input of comparator 114. The voltage tapped off of potentiometer 68 by the sliding contact is applied through amplifier 122 and resistor 123 to the base terminal of transistor 114 as a control signal. This signal is developed by subtracting a bias signal from the accelerator signal in amplifier 122 so that, as the slider of potentiometer 68 is advanced toward the positive voltage end, the voltage applied to the base of transistor 114 decreases. This has the effect of increasing the current limit and increasing the operating cycle of power regulator 24 as the accelerator is increased.

That portion of the circuitry shown in FIG. 2C comprises a timer-control circuit (a functional part of the regeneration control circuit 48 of FIG. 1) which is responsive to the regenerative braking current to cause reversion of operation to the plug braking mode whenever the regenerative braking current remains below preselected values for preselected time periods.

Figure 2A:
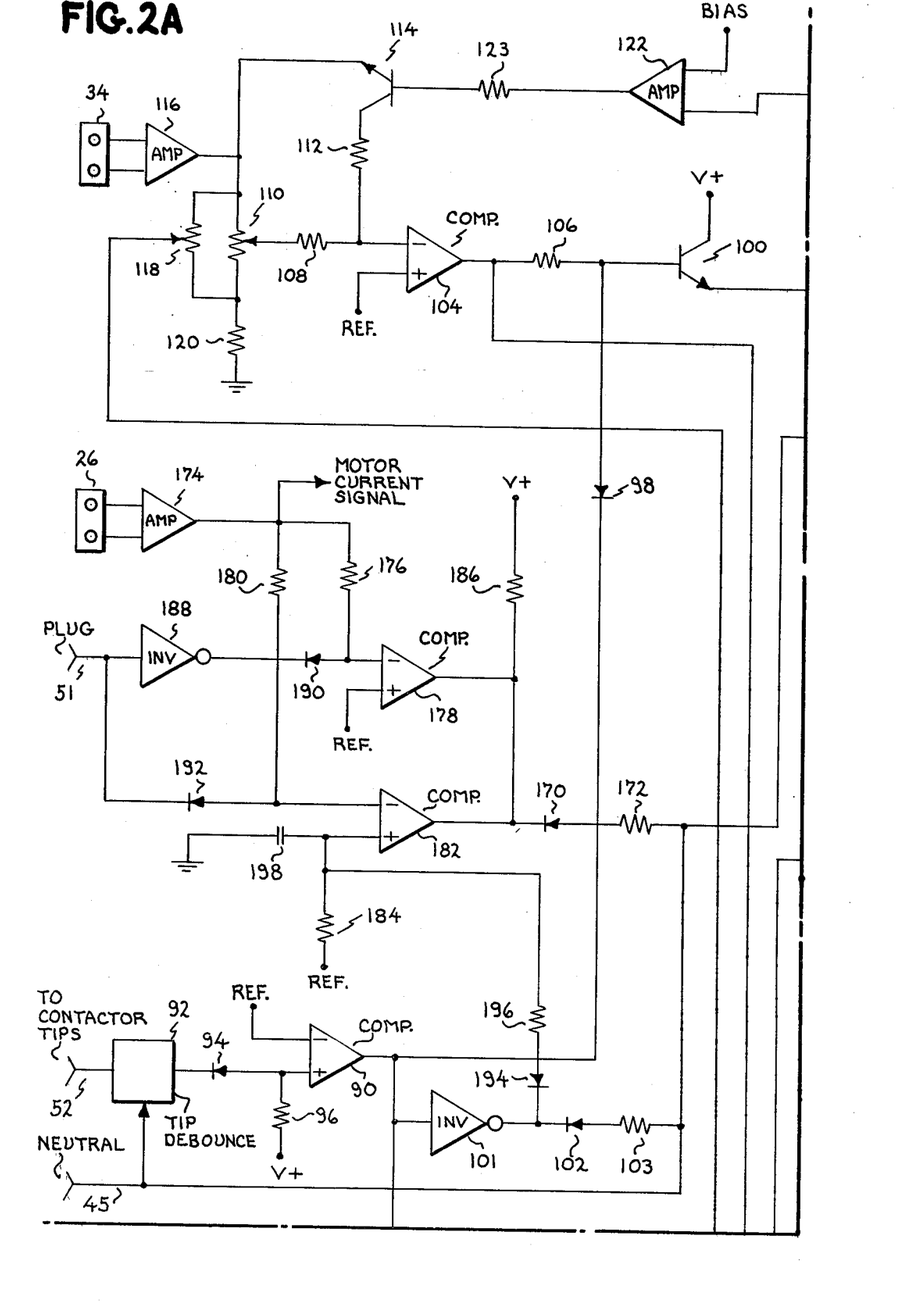
Figure 2C:
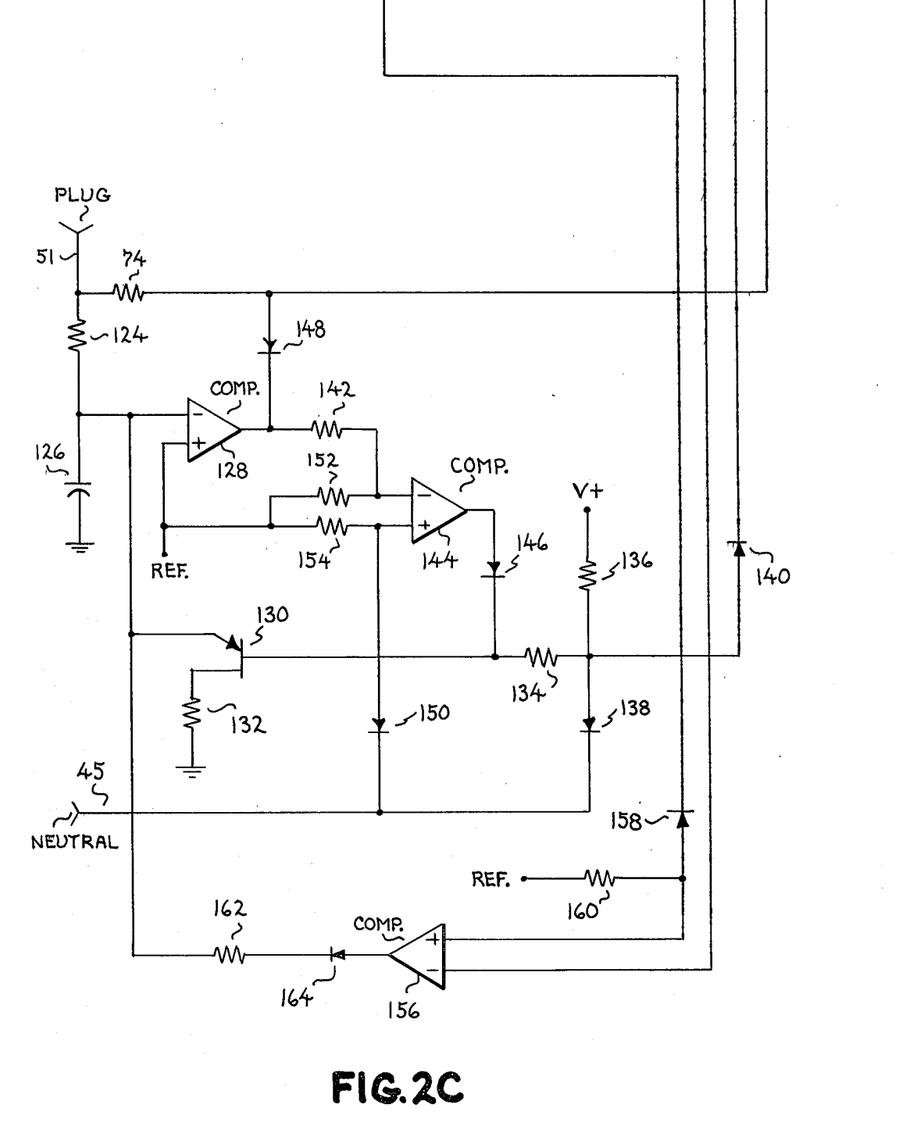

Referring particularly to FIG. 2C, the PLUG signal (a positive voltage level) applied to line 51 is also applied to an RC timing network comprising resistor 124 and capacitor 126. The PLUG signal tends to charge capacitor 126 so that the voltage at the junction of resistor 124 and capacitor 126 increases with time. This voltage is applied to the inverting input of comparator 128 and is compared with the reference voltage applied at the non-inverting input. Connected in parallel with capacitor 126 are the emitter-collector path of transistor 130 and resistor 132. Operatively, if transistor 130 is in a non-conductive state, capacitor 126 is allowed to be charged by the PLUG signal; if transistor 130 is in a conductive state, however, capacitor 126 is shunted and is not allowed to become charged. Transistor 130 is controlled by signals applied to its base terminal which is connected through resistor 134 and 136 to the positive supply voltage. The junction of resistors 134 and 136 is connected through diode 138 to the NEUTRAL signal line 45 and through diode 140 to the output of regenerative current limit comparator 104 (FIG. 2A). Each time the regenerative current limit is exceeded, the output of comparator 104 goes to zero and transistor 130 is turned on, shorting and discharging capacitor 126. Once the regenerative current again drops below the limit value, transistor 130 is rendered non-conductive and capacitor 126 is free to begin charging again. Thus, whenever regenerative current is less than the preselected limit (as determined by comparator 104, the setting of potentiometer 110, and the position of potentiometer 68), capacitor 126 charges. Ultimately, if capacitor 126 is not discharged as a result of reaching the regenerative current limit, the reference voltage applied to the non-inverting input of comparator 128 is exceeded. This then causes the output of comparator 128 to go to a low level which, through resistor 142, is applied to the inverting input of comparator 144. Comparator 144 functions as a latch such that the low level signal at its input causes a positive voltage level at its output terminal. This positive level signal is then applied through diode 146 to the base of transistor 130, holding it in the non-conductive state.

The logical zero (i.e., the low level) produced at the output of comparator 128 pulls the PLUG signal line (through diode 148), connected to the lower input of NAND gate 76 (FIG. 2B), to a logical zero causing (through NAND gate 84 and inverter 86) contactor coil 50 to be re-energized, the contactor tips to be reclosed, and reversion of braking back to the plug mode. Comparator 128 remains latched so that braking cannot be returned to the regenerative mode unless operation is first passed through neutral. The NEUTRAL signal is applied from line 45 through diode 150 to the non-inverting input of comparator 144 to unlatch comparators 128 and 144 and to allow transistor 130 to again become conductive. Resistors 152 and 154, connected respectively to the inverting and non-inverting inputs of comparator 144 and commonly to the referenced voltage applied to the non-inverting input of comparator 128, are sized to assure that the comparator 144 is reset by application of the NEUTRAL signal. The NEUTRAL signal is also applied through a diode 138 to transistor 130 so that capacitor 126 is discharged at the start of braking. Further, the NEUTRAL signal is passed through a conventional time delay circuit 151 to the lower input of NAND gate 76. Thus, the NEUTRAL signal is slightly delayed prior to its application to NAND gate 76. This protects the contact tips 22 from arcing effects since the field contacts F1, F2, R1 and R2 are allowed to drop out before contactor coil 50 is energized.

The circuitry just described provides for reversion to plug braking if regenerative current is below a first preselected value for a first preselected time period. In addition, however, should the regenerative current drop below an even lower value it is desirable to revert to plug braking sooner. This is achieved by applying the second regenerative current signal from the slider of potentiometer 118 to the inverting input of comparator 156. The output of tip comparator 90 is applied through diode 158 to the non-inverting input of comparator 156 to either inhibit comparator 156 or to allow the second regenerative current signal to be compared to the reference voltage (applied to the non-inverting input through resistor 160), depending on whether the contactor tips are opened or closed. Whenever the regenerative current signal drops below the referenced value, and if the comparator 156 is not inhibited, comparator 156 applies an added charge to capacitor 126 (through resistor 162 and diode 164) causing the voltage developed across capacitor 126 to more quickly reach the voltage that triggers comparator 128. Once triggered, operation is as described above and plug mode braking is resumed.

Current limiting is provided by circuitry, connected through diode 170 and resistor 172, to the base of transistor 62 for control of oscillator 60. The current limit circuitry comprises a differential amplifier 174 having input terminals connected to monitor the voltage developed across current shunt 26. The output terminal of differential amplifier 174 is connected to one resistor 176 to the inverting input terminal of comparator 178 and through a second resistor 180 to an inverting input terminal of a comparator 182. The non-inverting input of comparator 178 is connected to a positive reference voltage source. Similarly, a voltage reference is connected to the non-inverting input of comparator 182 through a resistor 184. The output terminals of comparators 178 and 182 are connected in parallel to the cathode end of diode 170 which is also connected via resistor 186 to a bias voltage source (not shown). A gating circuit including an inverter 188 and a diode 190, serially connected between the plug signal terminal 51 and the inverting input terminal of comparator 178, and further including a diode 192 connected between the plug input terminal 51 and the inverting input of comparator 182, provides means for selecting either comparator 178 or comparator 182 as a current limiting component, depending on whether operation is in a normal running or in a braking mode.

Comparator 182 also comes in to play at the resumption of plug braking (i.e., whenever contactor tips 22 of FIG. 1 are reclosed). The output of inverter 101 is connected to the non-inverting input of comparator 182 through diode 194 and resistor 196. Also connected to the same input of comparator 182 is a capacitor 198. With operation in the regenerative braking mode, the output of inverter 101 is at essentially ground potential (logical zero). This holds the potential across capacitor 198 at a low voltage causing the output of comparator 182 to be low and therefore limiting the output of transistor 62. When the braking mode reverts to the plug mode of operation, the output of inverter 101 goes positive. This then allows capacitor 198 to charge up until at some point the output of comparator 182 switches positive, allowing transistor 60 to increase the motor current. Effectively, the motor current is then ramped up gradually over time to a maximum value.

While there has been shown and described what is considered to be a preferred embodiment of the invention, modifications thereto will readily occur to those skilled in the art. It is desired, therefore, that the invention not be limited to the specific arrangement shown and described. It is intended that the appended claims shall encompass all such modifications and arrangements as may fall within the true spirit and scope of the invention.

The invention claimed is:

1. In a control system for a direct current traction motor having series connected field and armature windings, the control system being of the type including a regulator whose ratio of conduction to non-conduction periods determines the motor power, means for initiating electrical braking by reversing the polarity of current to the field winding, a current path for current generated in a plug braking mode of operation, a current path for current generated in a regenerative braking mode of operation, and a set of contacts whose operational state is opened or closed depending on the braking mode, an electrical braking control circuit, comprising:
   first control means causing braking current to flow in said plug braking path immediately upon initiation of electrical braking;
   first sensing means for sensing the current in said plug braking path to provide a signal indicative of plug braking current;
   second sensing means for sensing the ratio of on-time to off-time of said regulator to provide a signal indicative of said ratio; and
   second control means responsive to said plug braking current signal and said ratio signal to cause said contactor to change states causing braking current to switch from said plug braking path to said regenerative braking path whenever said plug braking current is greater than a preselected plug current value and said ratio of on time to off time is less than a preselected value.

2. The electrical braking control circuit of claim 1, further including:
   third sensing means for sensing the current in said regenerative braking path to provide a signal indicative of the regenerative braking current; and
   third control means responsive to said regenerative braking current signal to cause said contactor to change states causing braking current to revert back from said regenerative braking path to said plug braking path whenever said regenerative current remains below a first preselected regenerative current value for a first preselected time period.

3. The electrical braking control circuit of claim 2, further including:
   fourth control means responsive to said regenerative braking current signal to cause said contactor to change states causing braking current to revert back from said regenerative braking path to said plug braking path whenever said regenerative current remains below a second preselected regenerative current value for a second preselected time period, said second preselected regenerative current value being lower in amplitude than said first, and said second preselected time period being shorter than said first preselected time period.

4. The electrical braking control circuit of claim 3 wherein said contacts are closed prior to initiation of braking and remain closed for operation in the plug braking mode, and said first control means comprises:
   logic circuitry responsive to a braking initiation signal to cause said contacts to remain closed.

5. The electrical braking control circuit of claim 4 wherein the ratio of conduction to nonconduction periods of said regulator are responsive to a voltage controlled oscillator and said second sensing means comprises:
   electrical circuit means for generating a voltage signal whose amplitude controls said oscillator in response to an operator command, said voltage signal providing said ratio signal.

6. The electrical braking control circuit of claim 5 wherein said third control means comprises:
   electrical circuit means for controlling said regulator to limit the magnitude of current generated in said regenerative braking mode, said electrical circuit means causing said regulator to become non-conductive whenever said first preselected regenerative current value is exceeded; and
   a resettable timing means for timing the intervals during which said regenerative braking current is less than said first preselected regenerative current value and adapted to be reset by said electrical circuit means to an initial timing point whenever said first preselected regenerative current value is exceeded, said timing means providing a signal to cause said change of contactor states whenever said regenerative braking current is less than said first preselected regenerative current value for said first preselected time period.

7. The electrical braking control circuit of claim 6 wherein said second control means comprises:
   a first comparator circuit for comparing the amplitude of said voltage signal whose amplitude controls said oscillator to said preselected ratio value;
   a second comparator for comparing the plug braking current signal to said preselected plug current value; and
   logic circuit means responsive to the output signals from said first and second comparators to cause said change of state of said contactor.

8. The electrical braking control circuit of claim 7 wherein said resettable timing means comprises a resistance-capacitance timing network including a timing capacitor, a first comparator responsive to change its output state whenever the voltage on said timing capacitor exceeds a preset timing reference value, a latch comparator for latching said first comparator following said change of output states of said first comparator, and a switching means connected in parallel with said timing capacitor for discharging said timing capacitor to reset said timer.

9. The electrical braking control circuit of claim 8 further including means for gradually increasing the ratio of conductive to non-conductive periods of said regulator following reversion of said braking current back to said plug braking path from said regenerative braking path.

* * * * *